(12) United States Patent  
Citta et al.

(10) Patent No.: US 9,078,034 B2  
(45) Date of Patent: Jul. 7, 2015

(54) APPARATUS AND METHOD FOR COMMUNICATING BURST MODE ACTIVITY

(75) Inventors: Richard W. Citta, Oak Park, IL (US); Scott Matthew Lopresto, Chicago, IL (US); David Emery Virag, Noblesville, IN (US); Barth Alan Canfield, Indianapolis, IN (US)

(73) Assignee: Thomson Licensing, Boulogne-Billancourt (FR)

( * ) Notice: Subject to any disclaimer, the term of this patent is extended or adjusted under 35 U.S.C. 154(b) by 490 days.

(21) Appl. No.: 12/734,149

(22) PCT Filed: Oct. 14, 2008

(86) PCT No.: PCT/US2008/011709  
§ 371 (c)(1),  
(2), (4) Date: Apr. 14, 2010

(87) PCT Pub. No.: WO2009/051691  
PCT Pub. Date: Apr. 23, 2009

(65) Prior Publication Data  
US 2010/0299699 A1 Nov. 25, 2010

Related U.S. Application Data

(60) Provisional application No. 60/998,978, filed on Oct. 15, 2007, provisional application No. 60/998,961, filed on Oct. 15, 2007, provisional application No. 60/999,040, filed on Oct. 15, 2007, provisional (Continued)

(51) Int. Cl.  
*H04N 7/025* (2006.01)  
*H04N 21/435* (2011.01)  
(Continued)

(52) U.S. Cl.  
CPC ............ *H04N 21/435* (2013.01); *H04L 1/0041* (2013.01); *H04L 1/0045* (2013.01);  
(Continued)

(58) Field of Classification Search  
CPC ... H04N 7/165; H04N 21/812; H04N 21/814; H04N 21/6332; H04N 21/23805; G08B 27/008; H04L 65/608  
USPC ............. 725/67–71, 91–99, 114–118, 33, 36; 709/217–231  
See application file for complete search history.

(56) References Cited

U.S. PATENT DOCUMENTS 5,809,242 A 9/1998 Shaw et al.  
5,978,855 A 11/1999 Metz et al.  
(Continued)

FOREIGN PATENT DOCUMENTS

EP 1 533 727 A1 A1 5/2005  
WO WO 02/100026 A1 12/2002  
WO 2007099978 9/2007

OTHER PUBLICATIONS

ETSI: "DVB-H Implementation Guidelines DVB Bluebook document A092 Rev. May 2, 2007", Internet Citation, May 2007, pp. 13-24, paragraphs 4.2-5.3.7.

(Continued)

*Primary Examiner* — Annan Shang  
(74) *Attorney, Agent, or Firm* — Robert D. Shedd; Vincent E. Duffy; James McKenzie

(57) ABSTRACT

Information is transmitted indicating when a burst mode will take place which intervenes during a regular transmission mode. The information transmitted can also include information indicating how long such a burst mode will be and the contents of the burst mode where such contents can be identified as video, audio, system information, advertisements, or interactive content.

16 Claims, 10 Drawing Sheets

Related U.S. Application Data application No. 61/190,499, filed on Aug. 29, 2008, provisional application No. 61/190,516, filed on Aug. 29, 2008, provisional application No. 61/190,517, filed on Aug. 29, 2008.

(51) Int. Cl.

| | | |
|---|---|---|
| *H04L 1/00* | (2006.01) | |
| *H04L 25/02* | (2006.01) | |
| *H04N 21/235* | (2011.01) | |
| *H04N 21/2365* | (2011.01) | |
| *H04N 21/2381* | (2011.01) | |
| *H04N 21/61* | (2011.01) | |
| *H04N 21/643* | (2011.01) | |
| *H04L 29/06* | (2006.01) | |

(52) U.S. Cl.
CPC ............... *H04L 1/005* (2013.01); *H04L 1/0055* (2013.01); *H04L 1/0057* (2013.01); *H04L 1/006* (2013.01); *H04L 1/0065* (2013.01); *H04L 1/0068* (2013.01); *H04L 1/0071* (2013.01); *H04L 25/0226* (2013.01); *H04N 21/235* (2013.01); *H04N 21/2353* (2013.01); *H04N 21/2365* (2013.01); *H04N 21/2381* (2013.01); *H04N 21/6131* (2013.01); *H04N 21/64315* (2013.01); *H04L 65/607* (2013.01)

(56) References Cited

U.S. PATENT DOCUMENTS

| | | | | |
|---|---|---|---|---|
| 8,495,695 B2* | 7/2013 | Kim et al. | ...................... | 725/116 |
| 8,553,723 B2* | 10/2013 | Clerget et al. | .................. | 370/476 |
| 2003/0128746 A1 | 7/2003 | Lerner et al. | | |
| 2006/0246836 A1 | 11/2006 | Simon | | |
| 2008/0080474 A1* | 4/2008 | Kitchin | .......................... | 370/349 |
| 2011/0131614 A1* | 6/2011 | Sayadi et al. | ................... | 725/62 |

OTHER PUBLICATIONS

Sebastian Max et al., "OFDM-UWB Physical Layer Emulation for Event-Based MAC Simulation", The 17th Annual IEEE International Symposium on Personal, Indoor and Mobile Radio Communications (PIMRC'06), Sep. 1, 2006, pp. 1-5, Germany.

Sam Roweis, "Equivalent Codes & Systematic Forms", CSC310-Information Theory, Nov. 9, 2005.

Jay M. Jacobsmeyer, "Introduction to Error-Control Coding", Pericle Communications Company, 2004, pp. 1-16.

Advanced Television Systems Committee, "ATSC Digital Television Standard Part-2—RF/Transmission System Characteristics", Doc. A/53, Part 2:2007, Jan. 3, 2007, pp. 1-44.

N. Seshadri et al., "Channel Coding for Cochannel Inference Suppression in Wireless Communication Systems", IEEE, 1995, pp. 629-633.

3GPP, 3rd Generation Partnership Project (3GPP); Technical Specification Group Radio Access Network Multiplexing and Channel Coding (FDD):, 3G TS 25.212 Version 3.0.0, Oct. 1999, pp. 1-54.

"Generalized Parity Check Codes", 1981, pp. 60-61.

Advanced Television Systems Committee, ATSC Recommended Practice: Program and System Information Protocol Implementation Guidelines for Broadcasters:, Doc. A/69, Jun. 25, 2002, pp. 1-93.

Search Report dated Sep. 11, 2009.

\* cited by examiner

FIG. 4

# APPARATUS AND METHOD FOR COMMUNICATING BURST MODE ACTIVITY

This application claims the benefit under 35 U.S.C. §119 of the following provisional applications filed in the United States Patent and Trademark Office: (1) Filing No. 60/998,978 filed on Oct. 15, 2007; (2) Filing No. 60/998,961 filed on Oct. 15, 2007; (3) Filing No. 60/999,040 filed on Oct. 15, 2007; (4) Filing No. 61/190,499 filed on Aug. 29, 2008; (5) Filing No. 61/190,516 filed on Aug. 29, 2008; and (6) Filing No. 61/190,517 filed on Aug. 29, 2008.

CROSS REFERENCE TO RELATED APPLICATION

This application is related to the following co-pending, commonly owned, U.S. Patent Applications: (1) U.S. patent application Ser. No. 12/599,355 entitled APPARATUS AND METHOD FOR ENCODING AND DECODING SIGNALS filed on May 16, 2008 as International Patent Application No. PCT/US08/006334; (2) entitled APPARATUS AND METHOD FOR ENCODING AND DECODING SIGNALS filed on May 16, 2008 as International Patent Application No. PCT/US08/006335; (3) U.S. patent application Ser. No. 12/599,391 entitled APPARATUS AND METHOD FOR ENCODING AND DECODING SIGNALS filed on May 16, 2008 as International Patent Application No. PCT/US08/006333; (4) U.S. patent application Ser. No. 12/599,734 entitled APPARATUS AND METHOD FOR ENCODING AND DECODING SIGNALS filed on May 16, 2008 as International Patent Application No. PCT/US08/006332; (5) U.S. patent application Ser. No. 12/599,757 entitled APPARATUS AND METHOD FOR ENCODING AND DECODING SIGNALS filed on May 16, 2008 as International Patent Application No. PCT/US08/006331; (6) entitled PREAMBLE FOR A DIGITAL TELEVISION SYSTEM filed on Oct. 14, 2008 as International Patent Application No. PCT/US08/011711; (7) U.S. patent application Ser. No. 12/733,961 entitled CODE RATE IDENTIFIER IN PSUEDORANDOM SEQUENCE IN ATSC SIGNAL filed on Oct. 14, 2008 as International Patent Application No. PCT/US08/011707; and (8) entitled APPARATUS AND METHOD FOR ENCODING AND DECODING SIGNALS filed on Oct. 14, 2008 as International Patent Application No. PCT/US08/011705.

FIELD OF THE INVENTION

The present disclosure relates generally to the operation of a digital broadcast system and more specifically to the encoding and decoding of data for broadcast television that is intended for use by mobile, pedestrian and personal devices.

BACKGROUND OF THE INVENTION

This section is intended to introduce the reader to various aspects of art, which can be related to various aspects of the present invention that are described below. This discussion is believed to be helpful in providing the reader with background information to facilitate a better understanding of the various aspects of the present invention. Accordingly, it should be understood that these statements are to be read in this light, and not as admissions of prior art.

Television broadcast systems throughout the world have migrated from the delivery of analog audio and video signals to modern digital communications systems. For example, in the United States, the Advanced Television Standards Committee (ATSC) has developed a standard called "ATSC Standard: Digital Television Standard A/53" (the A53 standard). The A53 standard defines how data for digital television broadcasts should be encoded and decoded. In addition, the U.S. Federal Communications Commission (FCC) has allocated portions of the electromagnetic spectrum for television broadcasts. The FCC assigns a contiguous 6 MHz channel within the allocated portion to a broadcaster for transmission of terrestrial (i.e., not cable or satellite) digital television broadcasts. Each 6 MHz channel has a channel capacity of approximately 19 Mb/second based on the encoding and modulation format in the A53 standard. Furthermore, the FCC has mandated that transmissions of terrestrial digital television data through the 6 MHz channel must comply with the A53 standard.

The A53 standard defines how source data (e.g., digital audio and video data) should be processed and modulated into a signal that is transmitted through the channel. The processing adds redundant information to the source data so that a receiver that receives the signal from the channel can recover the source data even if the channel adds noise and multi-path interference to the transmitted signal. The redundant information added to the source data reduces the effective data rate at which the source data is transmitted but increases the potential for successful recovery of the source data from the transmitted signal.

FIG. 1 shows a block diagram of a typical transmitting system 100 that transmits signal compliant with the A53 standard. Data is generated by a transmission source 102 and is arranged into packets. The packets are 187 bytes in size and can contain one or more codewords. Each packet includes a 3-byte header of which 13-bits are a packet ID (PID) that identifies the type of data that are sent in the packet. For example, a packet with a PID that has a value of 0x11 (hex 11) can identify the content as having a first video stream and a packet comprising a PID that has a value of 0x14 can identify the contents of such packet as a first audio stream. A data randomizer 104 randomizes the packet and provides the packet to Reed-Solomon encoder 106. The Reed-Solomon encoder 106 calculates and concatenates 20 parity bytes to the randomized data to produce an R-S packet that has 207 bytes.

A convolutional interleaver 108 interleaves the R-S packet in order to further randomize the data in time. A trellis encoder 110 encodes the interleaved packet to produce a block of 828 3-bit symbols. The A53 standard specifies the use of 12 trellis encoders, wherein each trellis encoder is a 2/3-rate trellis encoder producing a 3 bit symbol for every two bits present in the interleaved packet. As a result, the trellis encoder 110 includes a de-multiplexer, twelve parallel 2/3-rate trellis encoders, and a multiplexer. Data from the convolutional interleaver 108 is de-multiplexed and distributed to the twelve trellis encoders and the symbols generated by the twelve trellis encoders are multiplexed into stream of symbols.

A sync multiplexer 112 inserts 4 predefined segment sync symbols at the beginning of each 828-symbol block to create an 832-symbol segment. In addition, the sync multiplexer 112 inserts a field sync comprising 832 symbols for every 312 segments that are generated. In particular, the field sync symbols precede the 312 segments.

An 8-VSB modulator 114 uses the multiplexed symbols, including the data encoded by the trellis encoder 110, the segment sync symbols, and the field sync to modulate a carrier signal using 8-VSB (vestigial sideband) modulation. Specifically, the 8-VSB modulator 114 generates a signal, wherein the amplitude of the signal is at one of 8 discrete levels, where each discrete level corresponds to a particular 3-bit symbol. The signal is thereafter converted from digital to analog signal format and up-converted to radio frequency, using circuitry not shown. The radio frequency signal is transmitted using an antenna 116. Typically, the combination of the data randomizer 104, the Reed-Solomon encoder 106, the convolutional interleaver 108, and the trellis encoder 110 are referred to as an 8-VSB encoder 120. 8-VSB encoder 120 can also be referred to as an A53 encoder or ATSC encoder.

The data generated by the transmission source 102 includes video that is source encoded using the motion picture entertainment group (MPEG) 2 format that is also equivalent to International Standards Organization/International Electrotechnical Commission (ISO/IEC) 13818-2 format. The transmission source 102 also includes audio data that is source encoded using Dolby Arc Consistency algorithm #3 (AC-3). The A53 standard also allows the use of metadata for other program elements such as program guide data and such program elements can be source encoded using other methods. In addition, The A53 standard allows transmission of video at a variety of video quality levels and display formats ranging from standard definition interlaced television quality to progressive scan widescreen high definition quality. The FCC requires that broadcasters must use the A53 standard to encode data generated by the transmission source 102. If the transmission of a digital television program broadcast does not require the entire 19 Mb/second capacity of the allocated channel, the broadcaster can use any excess capacity to broadcast other services, possibly even to devices such as portable receivers and cellular telephones. However, the FCC requires that any data transmitted to such other devices using the excess capacity must be transmitted in accordance with the A53 standard. Revision of the A53 standard is possible and is contemplated by the ATSC, however the evolution must occur such that that existing, or so-called legacy, digital television receivers can continue to be used. Similarly, encoding and transmission of signals in accordance with the existing A53 standard can be referred to as legacy encoding and transmission.

FIG. 2 shows a block diagram of a receiver 200 that can be used to extract the source information from a received signal compliant with the existing or legacy A53 standard. An antenna 202 develops a received electrical signal from an electromagnetic signal transmitted through the airwaves. An analog-to-digital (ND) converter 204 produces digital samples of the received signal and a trellis decoder 206 decodes the digital samples to produce a stream of trellis-decoded estimates of bits in the data stream. ND converter 204 can also include additional front end processing circuits such as a tuner for receiving a desired channel within the received signal. In accordance with the existing or legacy A53 standard, the trellis decoder 206 includes a signal de-multiplexer, twelve 2/3-rate trellis decoders and a signal multiplexer. The de-multiplexer distributes the digital samples among the twelve 2/3-rate trellis decoders and the multiplexer multiplexes the estimates generated byte each of the twelve 2/3-rate trellis decoders.

A convolutional de-interleaves 208 de-interleaves the stream of trellis-decoded bit estimates, producing sequences or packets arranged to include 207 bytes. The packet arrangement is performed in conjunction with the determination and identification of the location of the synchronization signals, not shown. A Reed-Solomon error correction circuit 210 considers each sequence of 207 bytes produced by the de-interleaver 208 as one or more codewords and determines if any bytes in the codewords or packets were corrupted due to an error during transmission. The determination is often performed by calculating and evaluating a set of syndromes or error patterns for the codewords. If corruption is detected, the Reed-Solomon error correction circuit 210 attempts to recover the corrupted bytes using the information encoded in the parity bytes. The resulting error-corrected data stream is then de-randomized by a de-randomizer 212 and thereafter provided to a data decoder 214 that decodes the data stream in accordance with the type of content being transmitted. Typically, the combination of the trellis decoder 206, the de-interleaver 208, the Reed-Solomon decoder 210, and the de-randomizer 212 are identified as an 8-VSB decoder 220 within receiver 200. It is important to note that, in general, the typical receiver for receiving signals compliant with the legacy A53 standard performs the receiving process in the reverse order of the transmitting process.

In general, the algorithms employed in Reed-Solomon encoding and decoding are well known to those skilled in the art. As described above, the Reed-Solomon encoder 106 of FIG. 1 generates a codeword that has 207 bytes by adding 20 parity bytes to a data packet having 187 bytes. The Reed-Solomon decoder 210 of FIG. 2 uses the 20 bytes added by the encoder to correct errors in up to 10 bytes of the codeword.

The Reed-Solomon error correction algorithm takes advantage of the properties of a Galois Field. Specifically, a Galois Field $GF(p^n)$ is a mathematical set comprising a finite number of elements $p^n$ where the values of p and n are integers. A particular Galois Field is defined using a generator polynomial $g(x)$. Each element of the Galois Field can be represented by a unique bit pattern having n bits. Furthermore, a unique polynomial of degree $p^n$ can be associated with each element where each coefficient of the polynomial is between 0 and p−1. Further, mathematical operations in the Galois Field have important properties. Addition of two elements of the Galois Field $GF(p^n)$ is defined as an element associated with a polynomial that has coefficients that are the modulo-p sum of the coefficients of the polynomials associated with the two elements being added. Similarly, multiplication of two elements is defined as the multiplication of the polynomials associated with the two elements modulo the generator polynomial $g(x)$ associated with the Galois Field. Addition and multiplication operators are defined over the Galois Field such that the sum and product of any two elements of the Galois Field are elements of the Galois Field. A property of the Reed-Solomon codeword is that multiplying each byte of the codeword by an element of the Galois Field results in another valid Reed-Solomon codeword. Furthermore, byte-by-byte addition of two Reed-Solomon codewords produces another Reed-Solomon codeword. The legacy A53 standard defines a 256 element Galois Field $GF(2^8)$ and the associated generator polynomial $g(x)$ for use in the Reed-Solomon algorithm. The properties of the Galois Field also create the ability to generate syndromes for the codewords in order to determine errors.

The output packets from the de-randomizer are provided to the data decoder 214. The data decoder 214 uses the PID in the header of the decoded packet to determine the type of information carried in the packet and how to decode such information. The PID in the header is compared to information in a Program Map Table (PMT) that can be periodically transmitted as part of the data stream and updated in the receiver. The data decoder 214 ignores any packet that has a PID for data packets that are not of a recognized type. In this manner, the legacy A53 standard allows for the creation of a new packet type not contemplated in the original standard by allowing a transmission source to assign a unique PID value for the new packet type. Legacy decoders that do not support the new packet type can ignore such packets while new decoders that do recognize the new packet type can process such packets.

As should be apparent, only those packets that are properly decoded by the 2/3-rate trellis decoder 206 and the Reed-Solomon decoder 210 in the receiver 200 are going to be provided to the data decoder 214. If the trellis decoder 206 or the Reed-Solomon decoder 210 cannot decode a packet, the receiver generally discards such packet as an error packet. If too many error packets are received, some receivers capable of receiving signals compliant with The A53 Standard can attempt to resynchronize with the transmitter.

It is important to note that signals compliant with the A53 standard, in general, can be transmitted in a manner other than over the air, including transmission over co-axial cable or telephone lines.

The existing or legacy A53 standard, at present, defines generating and transmitting a signal for the intended use by receivers that are generally fixed (e.g., in a home) and that are coupled to large antennas for capturing the transmitted signal. However, the transmitted signals are not sufficiently rugged or robust to allow a mobile receiver or a receiver with a small antenna that are used in portable televisions, vehicular televisions, cellular telephones, personal data assistants, etc. to effectively extract the source data encoded in such signals. In particular, the redundancy provided by the 2/3-rate trellis encoder is not sufficient and lower rate encoders (i.e., those that have greater redundancy) are necessary for mobile applications. Therefore it is desirable to introduce more robust encoding processes adapted to better perform with advanced receivers in mobile, handheld and pedestrian devices.

SUMMARY OF THE INVENTION

An invention for communicating the occurrence of burst modes and the data contents of such modes for mobile transmission system is disclosed.

BRIEF DESCRIPTION OF THE DRAWINGS

In the drawings:

FIG. 4 is a table illustrating row oriented data of the present disclosure;

The characteristics and advantages of the present invention can become more apparent from the following description, given by way of example.

DETAILED DESCRIPTION

One or more specific embodiments of the present disclosure will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and business-related constraints, which can vary from one implementation to another. Moreover, it should be appreciated that such a development effort would nevertheless be a routine undertaking of design, fabrication, and manufacture for those of ordinary skill having the benefit of this disclosure.

The following describes a system relating to television broadcast signals, and more particularly to broadcast signals as defined for use in the United States. The embodiments described can be used in mobile, handheld, or pedestrian devices. Examples of the devices used include, but are not limited to, cellular phones, intelligent phones, personal digital assistants, laptop computers, and portable televisions. Other systems utilized to transmit and receive other types of signals can include similar structures and processes. Those of ordinary skill in the art will appreciate that the embodiments of the circuits and processes described herein are merely one set of potential embodiments. As such, in alternate embodiments, the components of the system can be rearranged or omitted, or additional components can be added. For example, with minor modifications, the system described can be configured for use in satellite video and audio services or phone data services including services used elsewhere in the world.

Figure 1:
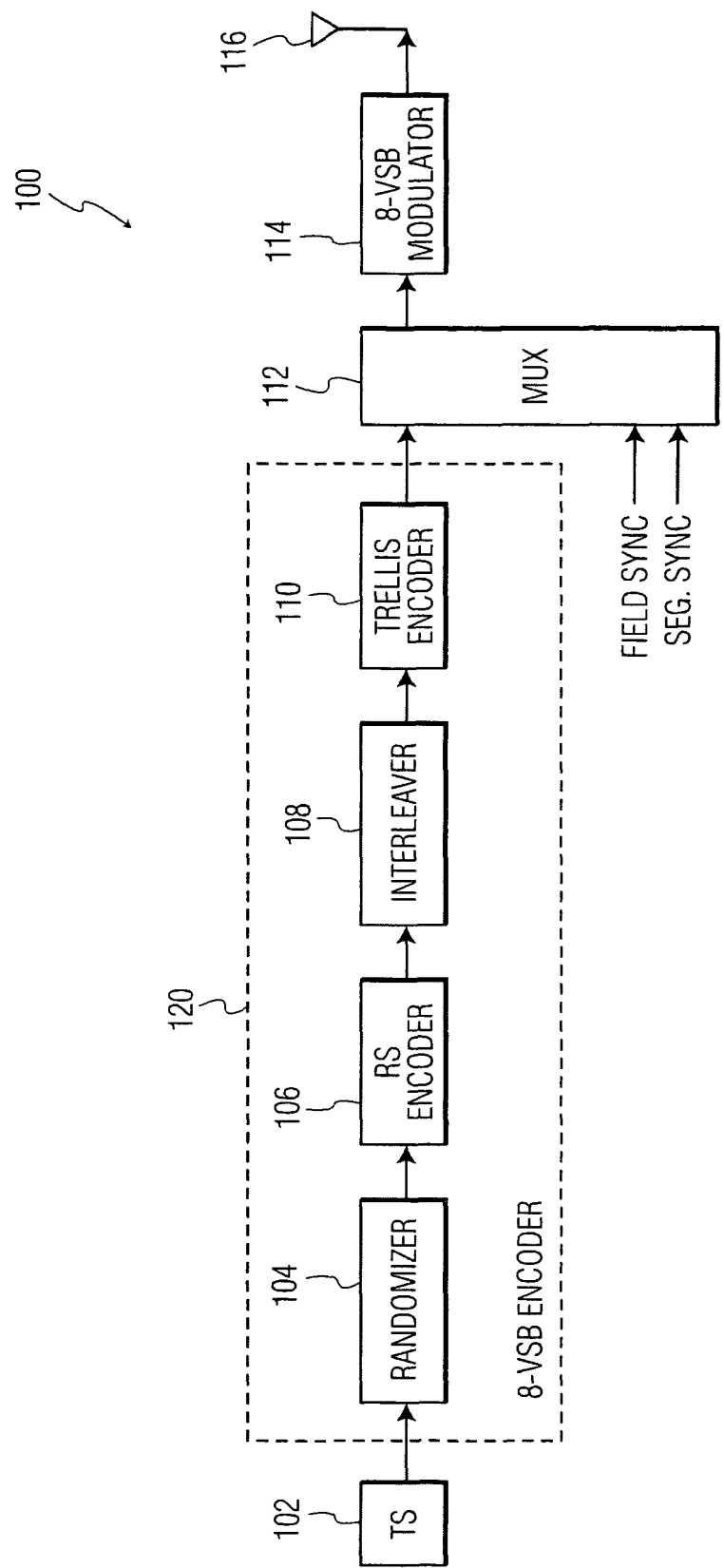
FIG. 1 is a block diagram of a typical transmitting system that transmits a signal compliant with the A53 Standard.
Figure 3:
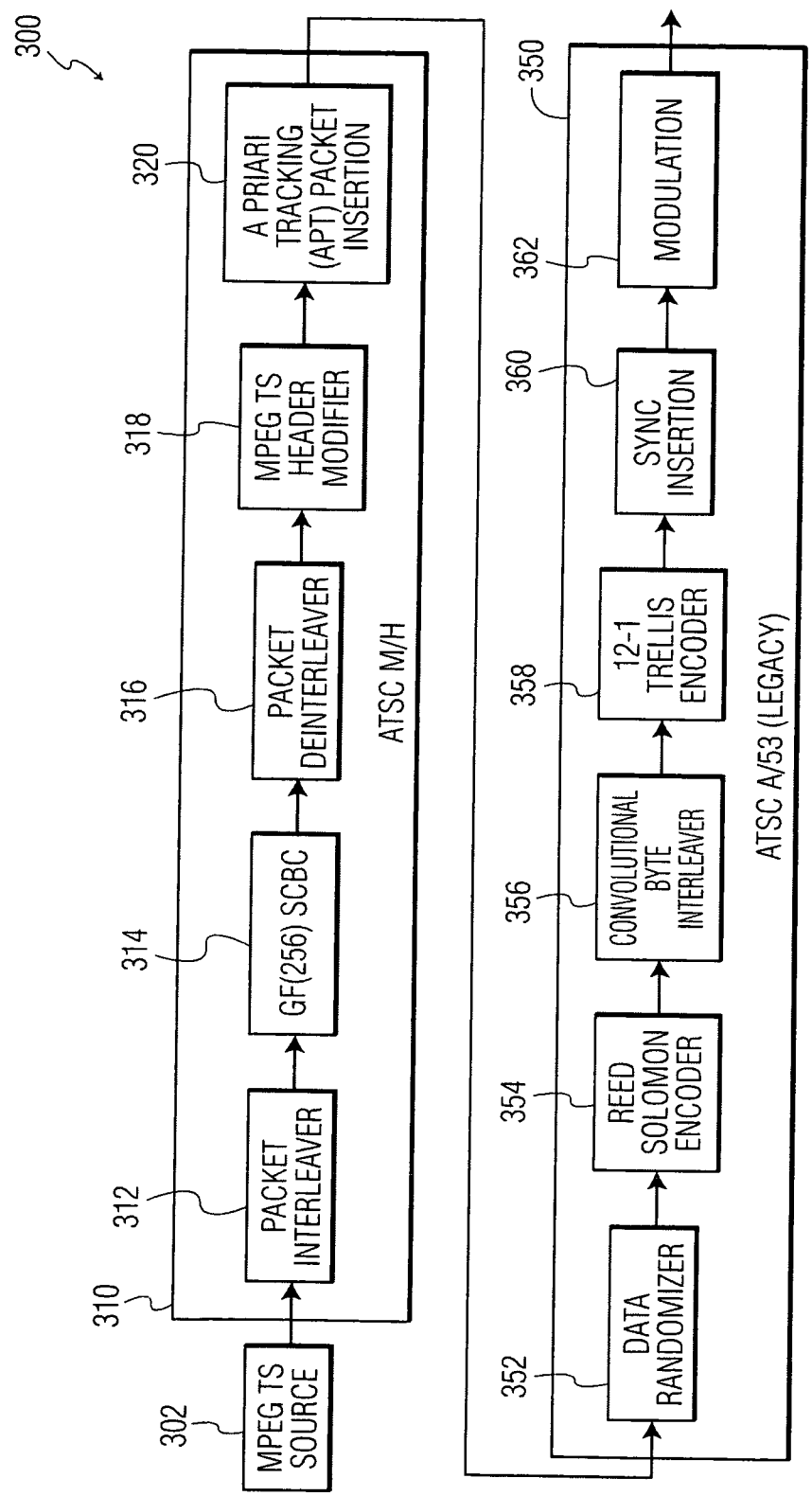
FIG. 3 is a block diagram of yet another embodiment of an encoder used in a transmitting device of the present disclosure.

Turning now to FIG. 3, a block diagram of an embodiment of an encoder 300 is shown. The operation of the encoder shown in FIG. 3 operates as a system that will modify an MPEG transport stream and process the stream for transmission for use in a mobile transmission system (such as ATSC M/H) which is then transmitted as part of an ATSC A/53 legacy system. Encoder 300 includes an MPEG transport stream source 1302. The MPEG transport stream source 302 is connected to an ATSC M/H block 310 that contains several additional blocks. The blocks contained within the ATSC M/H block 310 process an incoming data stream and produce a rugged data stream adapted for reception and use by mobile, pedestrian, and handheld devices. These blocks will be further described below. The ATSC M/H block 310 is connected to an ATSC A53 legacy block 350 that also contains several additional blocks within it. The data randomizer 352, Reed-Solomon encoder 354, convolutional byte interleaver 356, trellis encoder 1358, sync insertion block 360, and modulation block 362 contained within ATSC A53 legacy block 1350 are similar to those blocks described in FIG. 1. As a result, these blocks will not be further described here.

Within ATSC M/H block 310, a packet interleaver 312 receives a stream of data arranged in packets. Each packet contains 187 bytes and includes a 3 byte header used for packet identification. The output of the packet interleaver 312 is provided to a GF(256) Serial Concatenated Block Coder (SCBC) 314. The output of the GF(256) SCBC 314 is connected to a packet deinterleaver 316. The output of the packet deinterleaver 316 is connected to a transport stream header modifier 318. The output of the transport stream header modifier 318 is connected to an a-priori transport packet inserter 320. The output of the a-priori transport packet inserter 320 is connected to the ATSC A53 legacy encoder 350.

Figure 4:
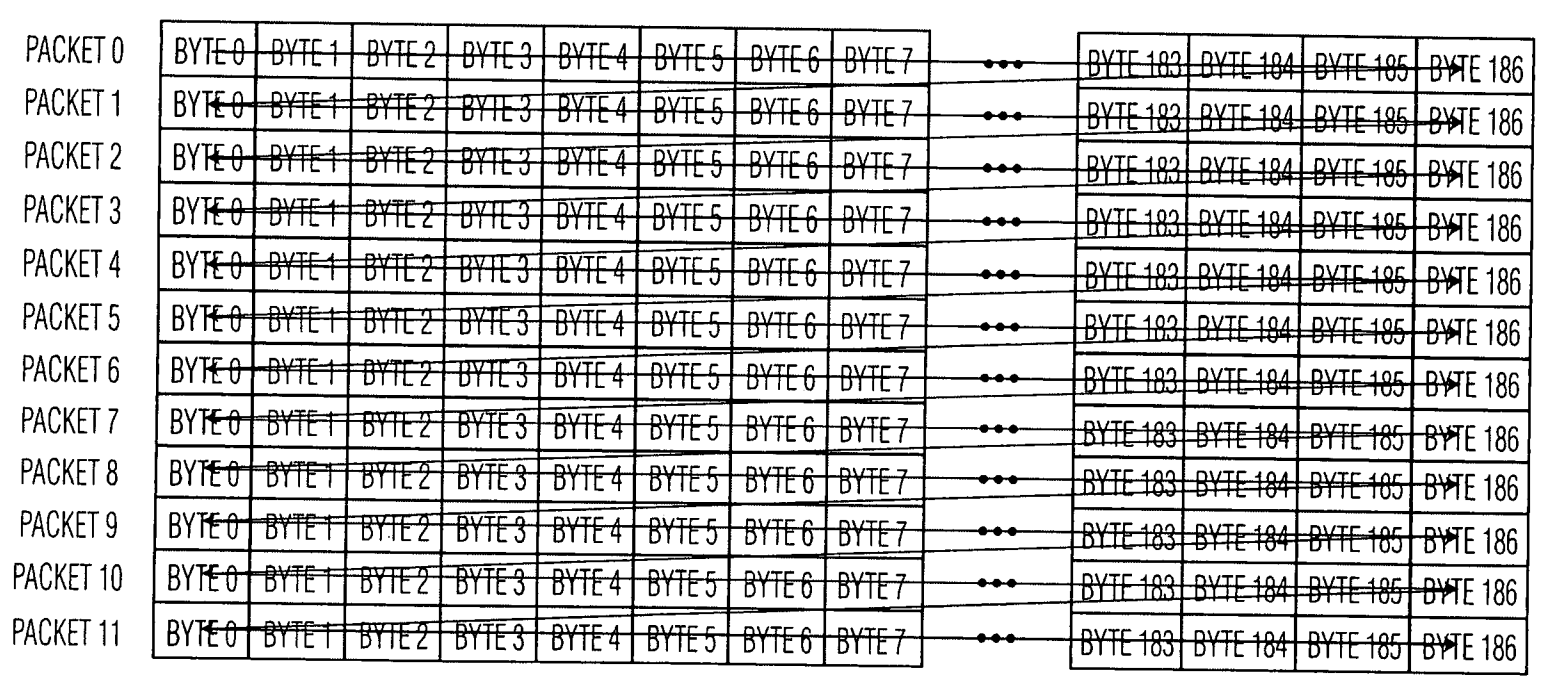
Figure 5:
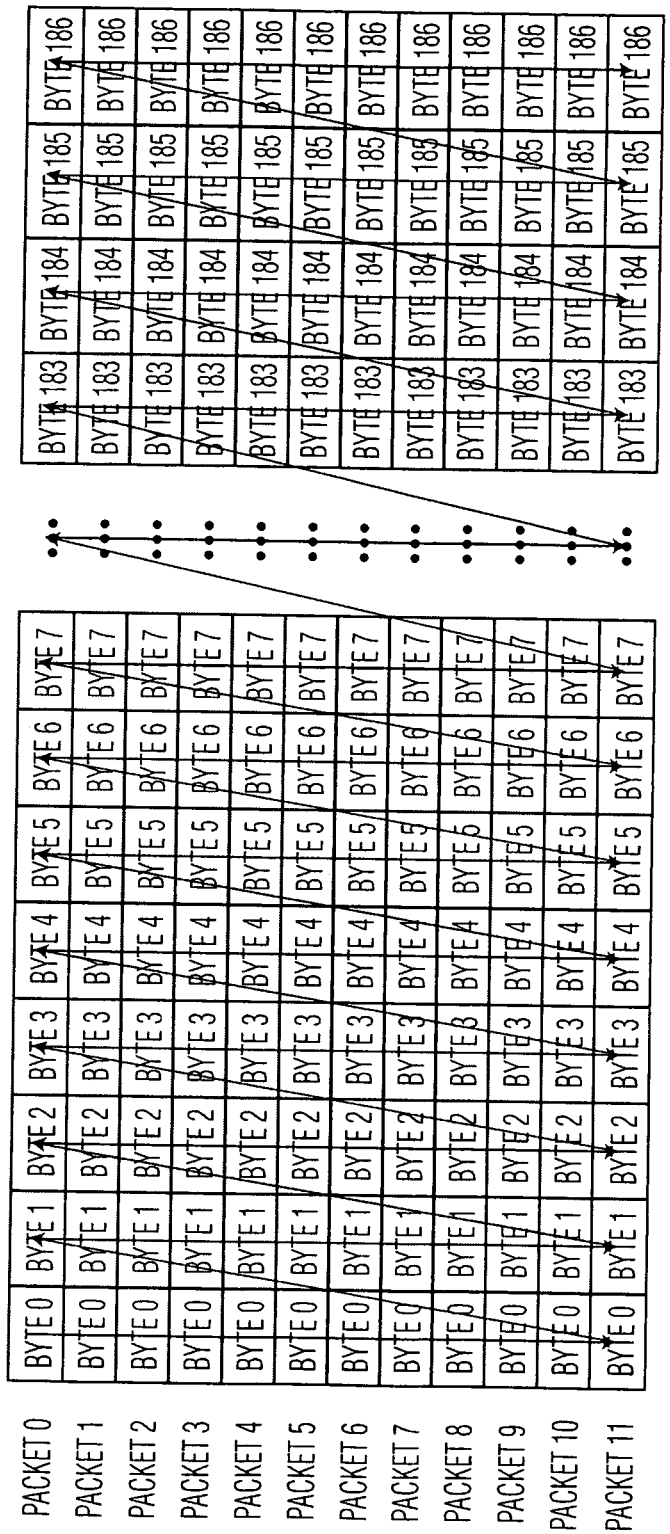
FIG. 5 is a table illustrating column oriented data of the present disclosure.

The packet interleaver 312 rearranges the data received as packets arranged in rows into codewords based on columns of bytes from the rows of packets. Packet interleaver 312 takes the bytes from a fixed number of consecutive packets in a row-by-row order as illustrated in FIG. 4, and outputs the bytes column by column as illustrated in FIG. 5. In particular, FIGS. 4 and 5 illustrate reading in 12 rows of 187-byte packets and outputting 187 columns of 12-byte codewords. As a result of the packet interleaving, all of the first bytes, labeled byte 0, are grouped together; all of the second bytes, labeled byte 1, are grouped together; and so forth. The number of packets read into the interleaver constitute a source frame and equals the number of source codewords or symbols required for processing in GF(256) SCBC 314. It is important to note that the dimension of packet interleaver 312 can changed based on the type and size of memory included. For instance, the first dimension can be changed to columns and the second dimension changed to rows. Additionally other dimensional arrangements can be used.

The GF(256) SCBC 314 is a block code encoder similar to the byte code encoders described previously. In particular, the GF(256) SCBC 314 is implemented using short linear block codes over the Galois Field (256) space. Two constituent block codes can be used. A rate 1/2 block code encoder uses the following generator matrix:

$$A(i)=C(i)\ i=1,2,\ldots,207 \qquad (1)$$

$$A'(i)=b*C(i)\ i=1,2,\ldots,207 \qquad (2)$$

$$M_{AB}(i)=M_A(i)*b_1+M_B(i)*b_2\ i=1,2,\ldots,187 \qquad (3)$$

$$G=(1\ 2) \qquad (4)$$

The matrix in (4) includes the b element with a value of from equation (1) present in the second column. A rate 2/3 block code encoder uses the following generator matrix:

$$G = \begin{pmatrix} 1 & 0 & 2 \\ 0 & 1 & 2 \end{pmatrix} \qquad (5)$$

The generator matrix is formed using an identity matrix and a column of b elements. The third column in matrix (5) includes the b elements from equations (2) and (3) with values of 2 such that B1 and B2 are equal to 2. It is important to note that the coefficients in the generator matrix for each constituent code have been optimized based on the relationship of the block code encoding to the entire error correction system and modulation process. The optimization has especially taken into account the trellis coding and bit to symbol mapping in the 8-VSB modulation because these aspects are the first aspects in the receiving and demodulation process.

The GF(256) SCBC 314 can be either a simple or concatenated block code encoder. A concatenated block code encoder can include other functions such as interleaving and puncturing as described earlier. The GF(256) SCBC 314 can also be capable of encoding multiple encoding rates and can further be capable of switching rate modes through a rate mode controller, not shown. In a preferred embodiment, the GF(256) SCBC 314 can be adapted to encode the incoming stream of data using one of a rate 1/2 constituent code as described earlier, a rate 12/26 code, a rate 12/52 code, or a rate 17/26 code.

The GF(256) SCBC 314 encodes the bytes along the columns outputted from interleaver 312. In other words, the GF(256) SCBC 1314 encodes following the second dimension of an interleaver matrix formed through the processing in packet interleaver 1312.

The packet deinterleaver 316 receives the encoded stream of codewords produced by the GF(256) SCBC 314 and outputs reconstituted rows of 187-byte packets. Packet deinterleaver 316 inputs the encoded codewords in column by column order, with each column including the redundant or non-systematic bytes added by the processing in the GF(256) SCBC 314, and outputs the bytes in a row by row arrangement. The process is essentially a reverse of the process described for packet interleaver 312 with reversing the order of FIGS. 4 and 5. The packet de-interleaver 312 inputs the same number of columns of codewords, with each codeword now including an encoded set of non-systematic bytes. The number of rows at the output corresponds to the encoded codeword length. For instance, in a 12/26 code rate, 26 rows of packets will be output. It is important to note that the dimension of packet de-interleaver 316 can changed based on the type and size of memory included. Further, the first dimension can be changed to rows and the second dimension changed to columns. Additionally other dimensional arrangements can be used.

The packets can be arranged into two distinct groups. The first group of packets can be referred to as systematic packets and are the same as the original packets of data provided by the transport stream source 302. The second group of packets can be referred to as non-systematic packets and are parity packets formed by the block coding process in the GF(256) SCBC 314. It is important to note that, as a result of the block encoding process, the number of columns (i.e. the size of the second dimension) has been increased.

The MPEG transport stream header modifier 318 receives the deinterleaved 187-byte packets containing groups of systematic and non-systematic packets. As described earlier, each packet contains a 3 byte header. The 3 bytes include a PID, along with several other bits or groups of bits used to convey information regarding the packet. In order to maintain the most efficient operation of receivers capable of receiving the legacy or A53 broadcast signal but not capable of correctly decoding the ATSC M/H encoded packets (e.g. legacy receivers), certain bits in the headers of a portion of the ATSC M/H packets can be modified. By modifying these bits in the non-systematic packet headers, the legacy receivers should ignore the packets while also not considering the packets as corrupt. For instance, the MPEG transport stream header modifier 318 can set the TEI bit, the payload unit start indicator bit, and the transport priority bit to a bit value of '0'. In addition, the scrambling control and adaptation field bits (2 bits each) can be set to '00'. The continuity counter, 3 bits long, can also be set to '000'. Finally, the PID can be set to a unique and unused value, such as a known value that will ignored by all legacy receivers. It is important to note that since the MPEG transport stream header modifier 318 will modify each header for the group of non-systematic packets, it can not be necessary for the GF(256) SCBC 1314 to process the headers for the group of non-systematic packets. Additionally, the MPEG transport stream header modifier 318 can also modify the headers of the systematic packets if these packets are not to be processed and correctly decoded by a legacy receiver. If the systematic packets are not encoded by the GF(256) SCBC encoder 314 or processed by MPEG transport stream header modifier 318, the resultant stream of data can be simulcast to and received by both mobile devices and legacy receivers.

The a-priori tracking packet inserter 320 can place predetermined tracking packets into the rugged data stream. The predetermined packets represent packets of information that are completely or mostly known to a receiver capable of receiving the rugged data stream, such as the receiver used in a mobile, pedestrian, or handheld device. The predetermined packets are used in the receiver to assist in decoding the trellis state created during the legacy or existing A53 encoding portion of the signal encoding and transmission. The predetermined packets can also assist with convergence in the equalizer portion of the receiver. It is important to note that the predetermined packets are not intended to improve reception in a legacy receiver, but can still result in a potential improvement. Also, unlike conventional training information, the predetermined packets are not directly identifiable at the transmitter output because the predetermined packets are added before additional legacy encoding is performed. In particular, the predetermined packets are altered by the processing of the trellis encoding. As a result, the predetermined packets do not provide direct training during trellis decoding but rather provide a priori branch information used in determining a trellis decoding map or branch.

The predetermined tracking packets can be generated in a number of ways using known training sequence processes. In a preferred embodiment, the predetermined tracking packet includes a valid header with the remaining bytes generated using a pseudo-random number (PN) generator that is also known to the receiver. The predetermined tracking packets, which can also be referred to as a-priori training data, trellis-obscured training data, or pseudo-training packets, can be distributed in some manner throughout the ATSC M/H transmission or can be clustered in a group including placing the packets or groups of packets in a manner that serves as a preamble for the ATSC M/H signal transmission.

The legacy ATSC encoder 350 identically encodes the systematic packets and non-systematic packets in compliance with the legacy A53 standard as described earlier. The additional functionality of ATSC M/H block 310 to produce a rugged or robust data stream can be added with minimal change to the existing hardware structure of transmission equipment. Additionally, portions of incoming packets from the MPEG transport source 302 can be extracted for encoding at one or more of the encoding rates in the ATSC M/H block 310. The encoded packets can then be reinserted in or appended to the remaining unprocessed portion of the input packets and the encoded and unprocessed portions both encoded in the ATSC legacy encoder 350. Alternately, a separate stream of packets can be provided to the ATSC M/H block 310 and the encoded output inserted in or appended to a second stream of packets and provided to the ATSC legacy encoder 350.

Figure 6:
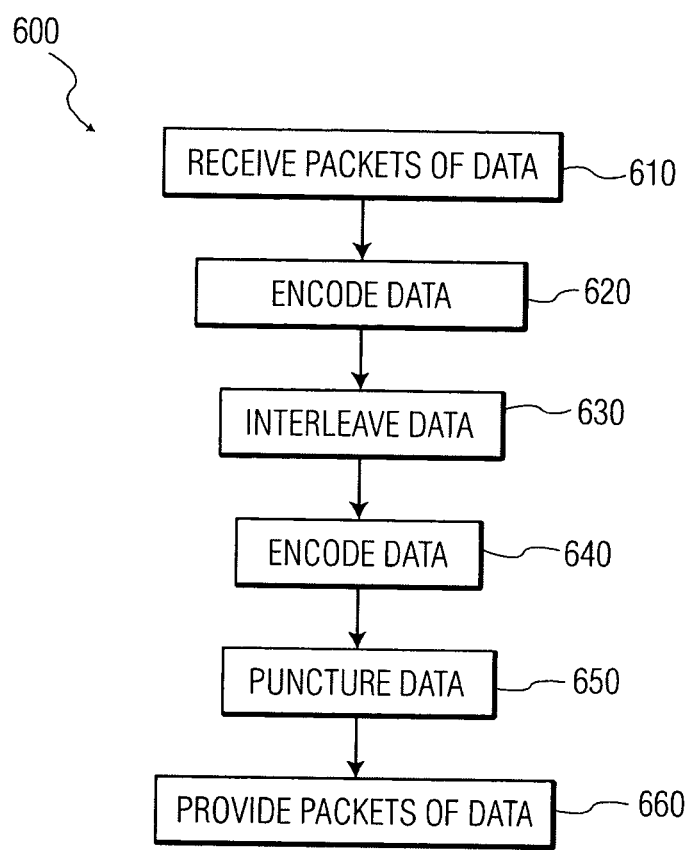
FIG. 6 is a flow chart of an embodiment of an encoding process of the present disclosure.

Turning now to FIG. 6 a flow chart showing an embodiment of an encoding process 600 is shown. Process 600 illustrates a concatenated byte-code encoding process that can be used to generate a rugged data stream from an input stream of data. Process 600 will be primarily described with reference to concatenated byte-code encoder. However, the process could easily be adapted to any byte-code encoder. It is also important to note that process 600 can be performed using hardware involving discrete processing blocks or an integrated circuit containing some or all of the necessary blocks, using software operating in a microprocessor device, or a combination of both hardware and software. Additionally, process 600 will be described with reference to bytes, codewords, and packets of data. However, it should be apparent to one skilled in the art that other data configurations or arrangements are possible and can be used.

First, at step 610, a stream of data is received. The stream of data can be arranged such that bytes of data can be grouped as codewords and further arranged into packets containing all or portions of one or more codewords. For instance, the data can be arranged in packets containing 187 bytes of data, with each packet containing a packet header used for identification purposes. Next, at step 620, the packets of data are byte-code encoded. The encoding at step 620 can be performed using one of the constituent encoders discussed previously. For instance, the encoding step 620 can use rate 2/3 byte-code encoding that results in outputting 18 bytes of data for every 12 input bytes of data. Alternately, the encoding step can use another byte-code encoding rate, such as rate 1/2. Supplementing the input data includes creating error creating error correction or redundant data bytes through an encoding process such as a byte code or block code encoding process. The output bytes include duplicates of the 12 input bytes of data, known as systematic bytes, along with 6 bytes of redundant or non-systematic data.

Next, at step 630, the encoded data bytes from step 1620 are interleaved. The interleaver size can be optimized to reduce the byte error rate in the presence of white noise. Next, at step 640, the interleaved bytes from step 630 are byte-code encoded a second time. The second byte-code encoding step 640 can be performed using one of the constituent encoders discussed previously. For instance, the encoding at step 620 can use a rate 2/3 byte-code encoding which results in outputting 27 bytes of data for every 18 input bytes of data. Alternately, the encoding step can use another byte-code encoding rate, such as rate 1/2. The output bytes include duplicates of the 18 input bytes of data, known as systematic bytes, along with 9 bytes of redundant or non-systematic data. It should also be apparent that some systematic bytes can be duplicates of one of the bytes of original input data or can be a byte developed as a redundant or non-systematic byte by the first byte-code encoding step 620.

Next, at step 650, the second encoded stream of bytes of data is punctured. The puncturing step 650 removes one of the bytes of data from the second encoded stream. The removed byte can be a non-systematic byte of the second encoding step 640, and can further be a non-systematic byte also from the first encoding step 620. Last, at step 660, the data stream is provided for additional processing, such as legacy or existing A53 encoding. Step 660 can also include re-packetizing the encoded bytes into packets similar to the arrangement originally received prior to providing the data stream. The process 600 described results in the generation of a rate 12/26 byte-code encoded data stream.

Puncturing at step 650 is optional for process 600. The choice of the byte for removal is performed based on the interleaving in step 630. For instance, it can be possible that the second encoding step 640 can not generate one of the non-systematic bytes as part of its encoding, directly resulting in a punctured stream. Additionally, the puncturing step 650 can be bypassed to produce an unpunctured rate 12/27 byte-code encoded data stream.

Puncturing at step 650 can also remove more than 1 byte from the second encoded stream. For instance, it can be possible to identify 3 bytes that can be removed to produce a rate 12/24 byte-code encoded data stream. Puncturing more than one byte will further degrade the effectiveness of the encoding while gaining an improvement in coding rate. Removal of additional bytes in the puncturing step 650 is achieved based on optimal interleaving at step 630. In this way the puncturing and interleaving interact to allow an optimal code rate based on producing a given output block size of output packets.

It is important to note that steps 630 and 640 can be repeated in order to form a different concatenated byte code encoding process including two interleaving steps and three byte-code encoding steps. A process using repeated steps 630 and 640 can be used to generate a rate 12/52 rugged data stream. Process 600 can also easily be adapted to other code rates such as those previously described above.

Figure 7:
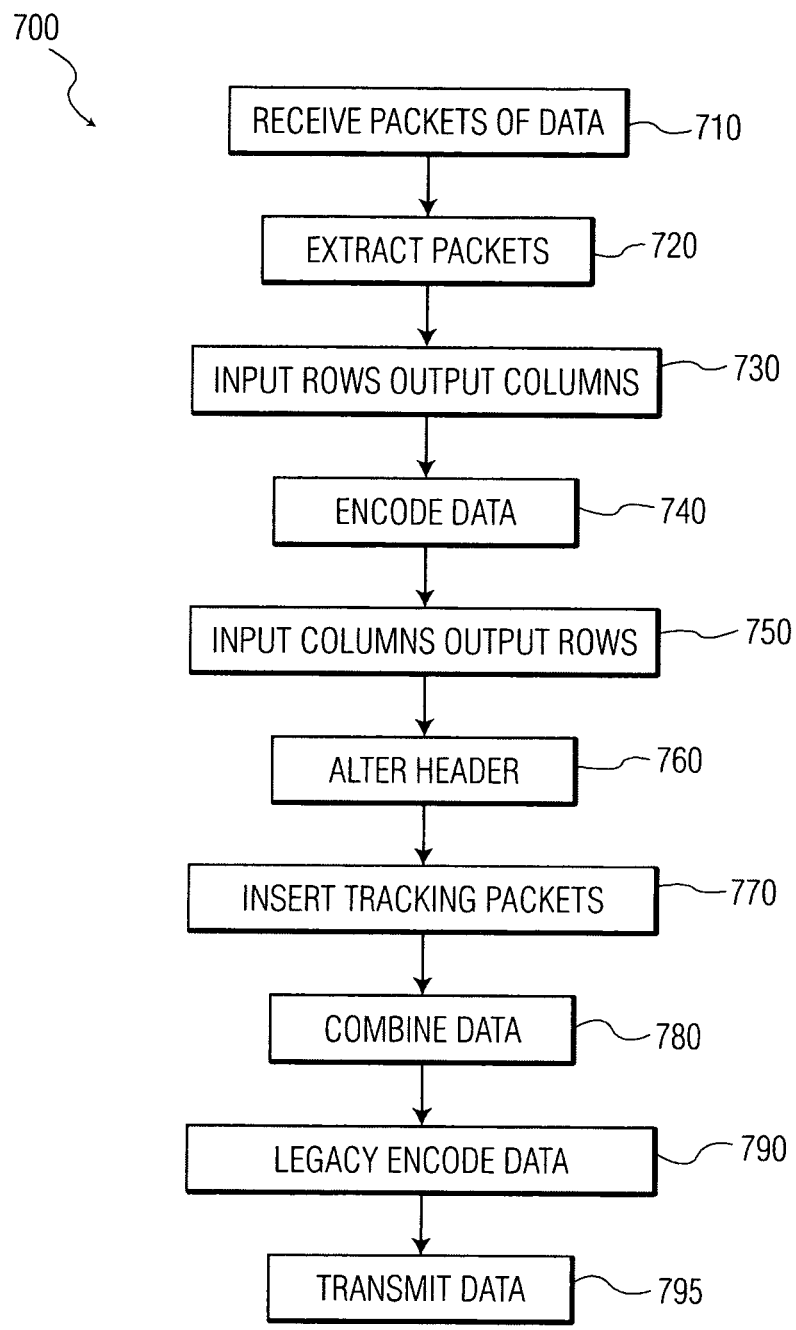
FIG. 7 is a flow chart of another embodiment of an encoding process of the present disclosure.

Turning now to FIG. 7, a flow chart showing another embodiment of an encoding process 700 is shown. Process 700 illustrates the steps for encoding and transmitting an ATSC M/H data stream including systematic and non-systematic or redundant data packets that also complies with the existing or legacy A53 signal format. Process 700 will be described primarily with reference to encoder 300 in FIG. 3. As above, process 700 can be performed using hardware involving discrete processing blocks or an integrated circuit containing some or all of the necessary blocks, using software operating in a microprocessor device, or a combination of both hardware and software. It is important to note that process 700 can be adapted by removing or rearranging certain steps based on the exact required implementation.

First, at step 710, a transport stream of packets is received. Each packet contains 187 bytes and includes a header. The header includes a PID as well as other information regarding the packet. Next, at step 720 the packets identified as used for ATSC M/H packets are separated or extracted. The remaining packets are identified as unprocessed. It is important to note that the ATSC M/H packets can be provided as a separate input transport stream of packets instead of extracted from a combined single transport stream. Additionally, all packets in the transport stream can be identified as ATSC M/H packets. Either of these conditions can eliminate the need for the extraction step 720. Further, the packets identified as either ATSC M/H or unprocessed can be grouped and the ATSC M/H identified packets can further be identified and grouped by separate encoding code-rates.

Next, at step 730, the sets or groups of ATSC M/H identified packets are read in or input as rows and output as columns or packet interleaved. The columns of output data are equivalent to codewords with the size of each codeword equal to the size of a group of packets. FIG. 14 and FIG. 15 illustrate the matrices showing the packet interleaving of reading in rows and outputting columns at step 730. It is important to note that the dimensions of the interleaver used in step 730 can be changed to, for instance, input columns and output rows or to use any other dimension aspects based on the interleaver implementation. Next, at step 740, each codeword from step 730 is block code encoded. The block code encoding at step 730 is similar to the byte-code encoding in process 600 and can use either a simple encoding process or a concatenated encoding process. For instance, block code encoding step 730 can encode the codewords using a rate 1/2 constituent code, a rate 12/26 code, a rate 12/52 code, or a rate 17/26 code.

Next, at step 750, the set of encoded codewords, are packet-deinterleaved by inputting the codewords as columns and outputting data packets as rows. The input codewords now contain the number of bytes generated by the block code encoding at step 730. The output packets are reconstituted into packets containing 187 bytes. The non-systematic bytes generated in block code encoding step 730 constitute additional rows of packets in the encoded stream of data. It is important to note that the dimensions of the de-interleaver used in step 760 can be changed to, for example, input columns and output rows or to use any other dimension aspects based on the interleaver implementation.

Next, at step 760, the header bytes in the encoded deinterleaved packets are altered. The altering step at 760 provides a way to prevent performance issues in receivers not capable of decoding ATSC M/H data packets by preventing the header information from being recognized by a legacy receiver. The altering at step 760 can include setting the TEI bit, the payload unit start indicator bit, and the transport priority bit to a bit value of '0'. The altering at step 760 can also include setting the scrambling control and adaptation field bits (2 bits each) to '00'. Altering step 760 can also include setting the continuity counter, which is 3 bits long, to '000'. Finally, the altering at step 760 can include setting the PID to a unique and unused value, such as a known value that will ignored by all legacy receivers. It is important to note that the header bytes can be ignored and not processed in encoding step 640.

At step 770, predetermined packets or a-priori tracking packets are inserted into the stream of encoded packets including altered header information. The insertion of a-priori tracking packets improves the performance of a receiver capable of receiving ATSC M/H or mobile video encoded signals. It is important to note that the insertion step 770 can replace existing redundant or non-systematic packets, or can replace a packet that was originally provided at step 710 as a null packet in the stream of data packets.

At step 780, the ATSC M/H encoded packets from step 770 are combined with the unprocessed portion of the transport stream of data. The ATSC M/H encoded packets can be inserted in, or appended to, the previously identified unprocessed portion of the transport stream of data packets. Alternately, the ATSCH M/H encoded packets from step 770 can be combined with, inserted in, or appended to, a second transport stream that is identified for legacy broadcast reception only. It is important to note that step 780 can be also removed if all of the packets at step 710 were identified and processed as ATSC M/H data packets. Next, at step 790, the complete data stream including all packets, ATSC M/H encoded or not, is processed using the legacy or existing encoding compliant with the A53 standard. The legacy encoding at step 790 includes Reed-Solomon encoding, randomizing, interleaving, trellis encoding and synchronization insertion. The legacy encoding step 790 can be performed by blocks such as those shown in legacy encoder 350.

Last, at step 795, the fully encoded data stream, including either all or a portion of the stream encoded as ATSC M/H data, is transmitted. The transmission step 795 can include transmitting using a specifically identified frequency range and can include transmitting using a wired technology, such as co-axial cable, or transmitting over the airwaves electromagnetically. It is important to note that the ATSC M/H data can be transmitted continuously. In this mode, the ATSC M/H systematic packets also serve as the data packets in a legacy receiver. The non-systematic packets would be ignored. However, separate ATSC M/H and legacy data can be transmitted in a manner that the ATSC M/H data is transmitted periodically, or transmitted continuously for short non-contiguous periods of time.

Figure 8:
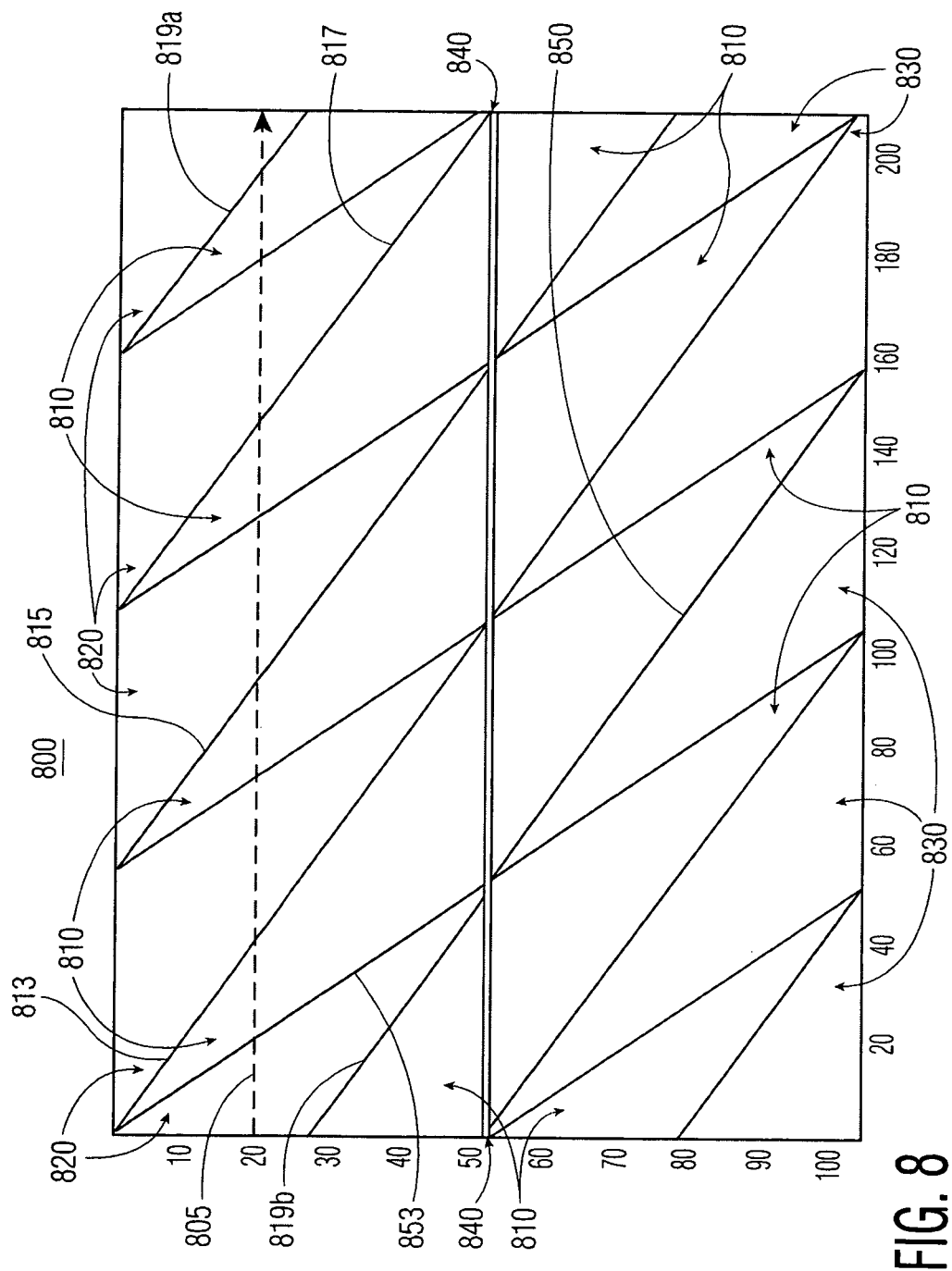
FIG. 8 is a table illustrating the mapping of bytes in an interleaver of the present disclosure.

Referring now to FIG. 8, a diagram illustrating locations of data blocks in a transmission frame after convolutional byte interleaver 356 according to an exemplary embodiment of the present invention is shown. More specifically, the interleaver map 800 illustrates the organization of incoming bytes of data during processing of convolutional byte interleaver 356 in FIG. 3. Although, convolutional byte interleaver 356 can be implemented using a series of delay lines, the interleaver map 800 may be considered as a memory map for the interleaver.

Interleaver map 800 indicates the location of input bytes that are placed or written in and how output bytes are read out. The dimensions of interleaver map 800 are indicated as bytes across the top, numbered from 0 to 208, and the rows of segments along the side from top to bottom, numbered from 0 to 103. Dotted line 805 indicates the order that bytes are read out. For instance, as line 805 represents row 20, all of the bytes in row 20 would be read out, starting with byte 0 and finishing with byte 208. When the last byte, Byte 208, is read out from row 20, the reading advances one row, to row 21, until the last row of the interleaver has been read out. When the last row is read out, the reading begins over with reading the first row (with new packet data).

Line 813 illustrates the location of the first 52 bytes of a 207-byte Reed-Solomon code word, based on reading in those bytes to Byte convolutional byte interleaver 356. Line 813 starts with the location of byte 0 in the packet and terminates at a center line 840 with the location of byte 51. Lines 815, 817, 819a, and 819b show the location of the remaining bytes in the first packet. Line 815 starts with the location of byte 52 at the top of the line, and so on, and processes with byte locations for each of lines 815, 817, and 819a. The remaining portion of bytes is located along line 819b and terminates with byte 208 at a location in a row one row below line 840. The location of bytes in successive packets continues to the left of the locations for the first packet and then process to the portion of the map below line 840 mirroring the procession and locations above line 840. For example, line 850 shows the location of a portion of the bytes for a fifty-second packet (i.e. a packet input 52 packets after the first packet) in convolutional byte interleaver 356. Line 853 illustrates a boundary line for the transmission of a grouping of packets. With each successive packet, the next successive byte from that packet falls on the boundary line. As a result, line 853 represents the packet 0 byte 0 location, followed by the packet 1 byte 1 location, and so on, to the packet 52 byte 52 location.

The locations of data on the M/H data blocks after convolutional byte interleaver 356 and Sync Insertion 360 are described below. It is noted that since the sync data is inserted at Sync. Insertion 360 after convolutional byte interleaver 356, the sync data is not interleaved. FIG. 8 illustrates a sequence of 104 data segments, each represented by one row. In this example, the upper wedge-shaped sections 820 represent the Data Blocks 8 and 9. The lower wedge-shaped sections 830 represent the Data Blocks 0 and 1. The center diamond shaped sections 810 represent Data Blocks 210 and 215. Line 840 represents the sync data to be inserted by Sync Inserter 360.

As illustrated in FIG. 8, the final byte of the preamble data will be delayed by approximately 52-data segments due to Byte Interleaver 356. Thus, the data from the two-block length preamble (i.e., 52 packets)—the same amount of data as 52-interleaved data segments—is spread over only within a relatively short range of 104-data segments in the interleaved ATSC A/53 transmission stream. This helps M/H receivers decode the interleaved preamble data within a desirable short period of time. As described above, the promptly decoded preamble data may be used for the improvement of the reception of the M/H digital television signals. To sum up, a proper length of the preamble is important to speed up the signal processing, including decoding, of the preamble information.

It is important to note that certain arrangements of sets of packets can provide more optimal transmission arrangements of a robust data stream. The arrangement of the robust data stream can be important if the robust data stream is not continuously transmitted (i.e. part of the data stream is legacy data). For instance, a set of 52 packets, as illustrated in FIG. 8, results in a transmission characteristic that includes transmitting robust data in a manner that can easily be predicted and identified using a de-interleaving process in a receiving system.

Figure 9:
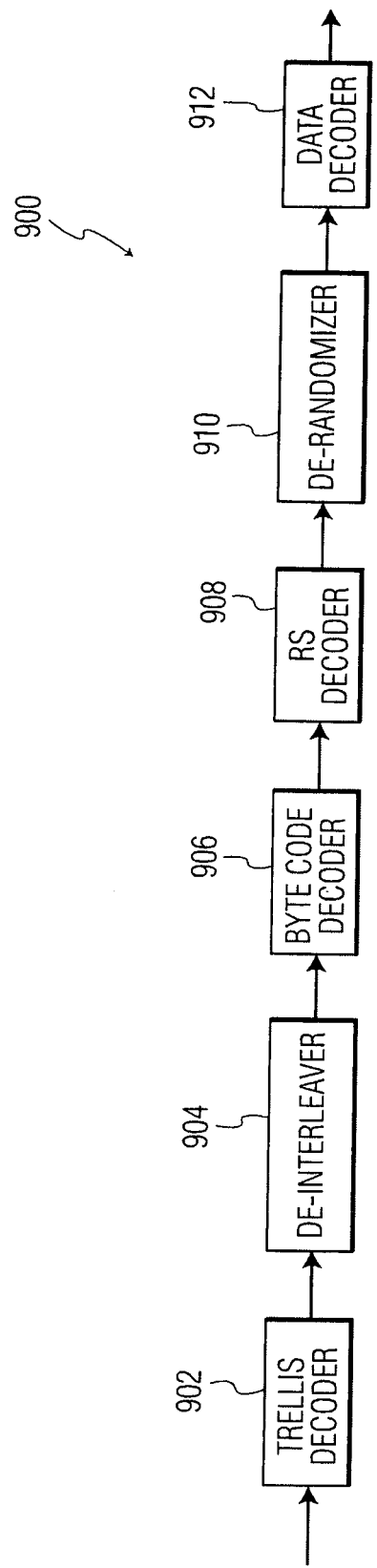
FIG. 9 is a block diagram of an embodiment of a decoder of the present disclosure.

Turning now to FIG. 9, a block diagram of an embodiment of a decoder 900 used in a receiver system is shown. Decoder 900 includes circuitry that is adapted to use redundant packets, such as the non-systematic packets in a data stream as described above, to aid in decoding data received by the receiver. Decoder 900 is also generally capable of decoding data that has been encoded using the legacy or existing A53 standard.

Figure 2:
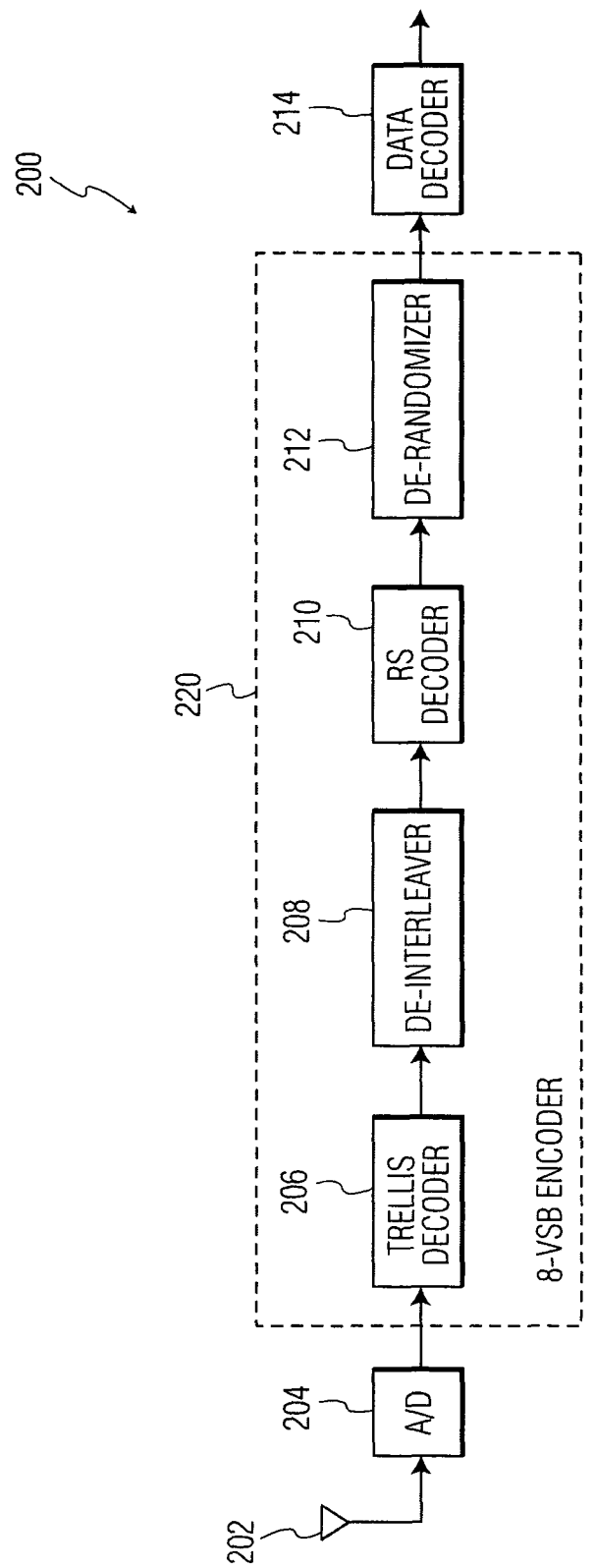
FIG. 2 is a block diagram of a typical receiver for receiving a signal compliant with the A53 Standard.

In decoder 900, following initial tuning, demodulation, and processing by other circuits (not shown) a trellis decoder 902 receives the incoming signal. The trellis decoder 902 is connected to a convolutional de-interleaver 904. The output of the convolutional de-interleaver 904 is connected to a byte-code decoder 906. The byte-code decoder 906 has an output that is connected to a Reed-Solomon decoder 908. The output of the Reed-Solomon decoder 908 is connected to a de-randomizer 910. The de-randominizer 910 output is connected to a data decoder 912. The data decoder 912 provides an output signal for use in the remaining portion of the receiver system such as video display or audio reproduction. The trellis decoder 902, de-interleaver 904, Reed-Solomon decoder 908, de-randomizer 910 and data decoder 912 are similar in function to blocks described in FIG. 2 and will not be further described in detail here.

The received data, in the form of bytes of data in data packets, is decoded by trellis decoder 902 and de-interleaved by de-interleaver 904. The data packets can include 207 bytes of data and further can be grouped in groups or 24, 26, or 52 packets. The trellis decoder 902 and de-interleaver 904 are capable of processing incoming legacy format data as well as byte-code encoded data. Based on a predetermined packet transmission sequence that is also known by the receiver, the byte-code decoder 906 determines if the packet is a packet included in a byte-code encoded or robust data stream. If the received packet is not from the byte-code encoded data stream then the received packet is provided to the Reed-Solomon decoder 908 without any further processing in byte-code decoder 906. Byte code decoder 906 can also include a de-randomizer that removes the known sequence of constants multiplied by or added to the data stream during encoding. It is important to note that a rugged data stream includes both systematic packets and bytes that are identical to the original data and non-systematic packets and bytes that contain redundant data.

If the byte-code decoder 906 determines that the received is a byte-code encoded packet belonging to robust or rugged data stream, the packet can be decoded along with other packets comprising the same data stream. In one embodiment, byte-code encoded packets of the same data stream are decoded by multiplying each byte within the packet by the inverse of the value of the b element that was used to develop the byte-coded packet as shown in equation (2) above. The decoded values of the bytes of the non-systematic packet are compared to the values of the bytes of the systematic packet and the values of any bytes in the two packets that are not identical can be erased (i.e., set to zero) in the systematic packet or can be replaced by the information in the non-systematic packet. The systematic packet with error bytes erased can thereafter be decoded using Reed-Solomon decoding performed in Reed-Solomon decoder 908. Further description of other embodiments of byte-code decoders will be discussed below.

Byte code decoder 906 can also be adapted to operate as a block coder for decoding signals. For instance, byte code decoder 906 can include a packet interleaver similar to packet interleaver 312 and a packet deinterleaver similar to packet deinterleaver 316. Additionally, the byte code encoder function can be adapted to decode a GF(256) Serial Concatenated Block Coded (SCBC) signal. The byte code decoder 906 can further include an identifier block used for identifying data encoded for mobile or ATSC M/H reception and/or identification of a-priori training packets. Additionally, the identifier block can include a packet identifier block to determine, for example, if the headers in the incoming packets include a PID used for mobile reception.

It is important to note that byte-code encoding can precede the Reed-Solomon encoding of data packets. However, in decoder 900 shown here, the incoming data is byte-code decoded before being the Reed-Solomon decoded. The re-ordering is possible because both the byte-code operation and Reed-Solomon code operation are linear over the Galois Field (256) used in the A53 standard, and linear operators are commutative in a Galois Field. The importance of the re-ordering is important because the byte-code encoding provides higher reliability for recovering errors in the received signal because the byte codes allow for an efficient soft encoding algorithm. As a result, performing byte-code decoding prior to Reed-Solomon decoding results in improved receiver performance as measured in terms of bit-error rate and signal to noise ratio.

Additionally, as with the description of the embodiments of encoder 300 in FIG. 3, it should be noted that the byte code decoding elements and process can be added to the elements, components, and circuits needed and used in a legacy receiver with minimal change to the legacy receiver. However, the decoding process can be enhanced by incorporating features of the byte code decoding process into other blocks in the legacy receiver.

The various systems using arrangements of byte-code encoding and decoding described above allow an expansion of the applications of the existing or legacy broadcast system. First, existing legacy receivers can benefit from the additional presence of packets encoded using ATSC M/H. The more robust SCBC encoded packets and the a-priori tracking packets can be processed by the trellis decoder and equalizer to improve tracking in dynamic signal environment conditions. Second, the ATSC M/H encoded data that creates a robust or rugged data that allow receiving systems in mobile, handheld, and pedestrian devices to receive the robust stream in signal environments that the legacy A53 transmission cannot be received. For instance, ATSC M/H encoding at rate 12/52 allows signal reception at a white noise threshold equal to 3.5 decibels (dB) as compared a white noise threshold of around 15 dB for legacy A53 reception. Operation is further enhanced by generating the ATSC M/H packets and transmitting the packets in a periodic manner along with the legacy A53 data. The periodic transmission is important to permit video and audio delivery of broadcast material. The ATSC M/H packets can also be grouped and transmitted as a one or more transmission bursts. Transmission in bursts is important for delivery of data content or content that can be stored for later use by the mobile, handheld, or pedestrian device.

The transmission of such period transmissions is known as a "burst mode" will in effect allow a transmitting system of FIG. 3 to transmit the ATSC M/H information at periodic intervals within a legacy A53 transmission (within the areas shown for example in FIG. 8.). That is, the receiver that is used with the ATSC M/H system will not always be tracking received ATSC M/H transmissions, so the receiver can be configure to acquire and receive coded data payloads in a short time interval. In some cases, these "burst modes" will be a contiguous transmission of data payloads. In other cases, a "burst mode" will transmit data payloads at infrequent times.

Additionally, the type of data payloads being transmitted can affect what burst modes a receiver is interested in. For example, one burst mode can have packets data packets be transmitted as a preamble to assist a receiver in functions of signal synchronization and channel acquisition. Other burst modes can operate where specific types of video/audio programming are transmitted to a receiver, and such programming can be cached for later viewing.

Ideally, a burst mode will make use of a standard time block slice equal to 26 packets based on the operation of a standard MPEG data packet (187 bytes plus 20 Reed Solomon bytes), as described above. It is expected that the size of using a block constructed from 26 packets represents 2 milliseconds of mobile data, and after interleaving, is spread over the course of 4 milliseconds of a transmission. The transmission of information associated with a burst mode operation is representative of multiples of 26 packets. The transmission system of FIG. 3 can be configured to transmit such multiples of 26 packets indefinitely or for a finite duration.

Figure 10:
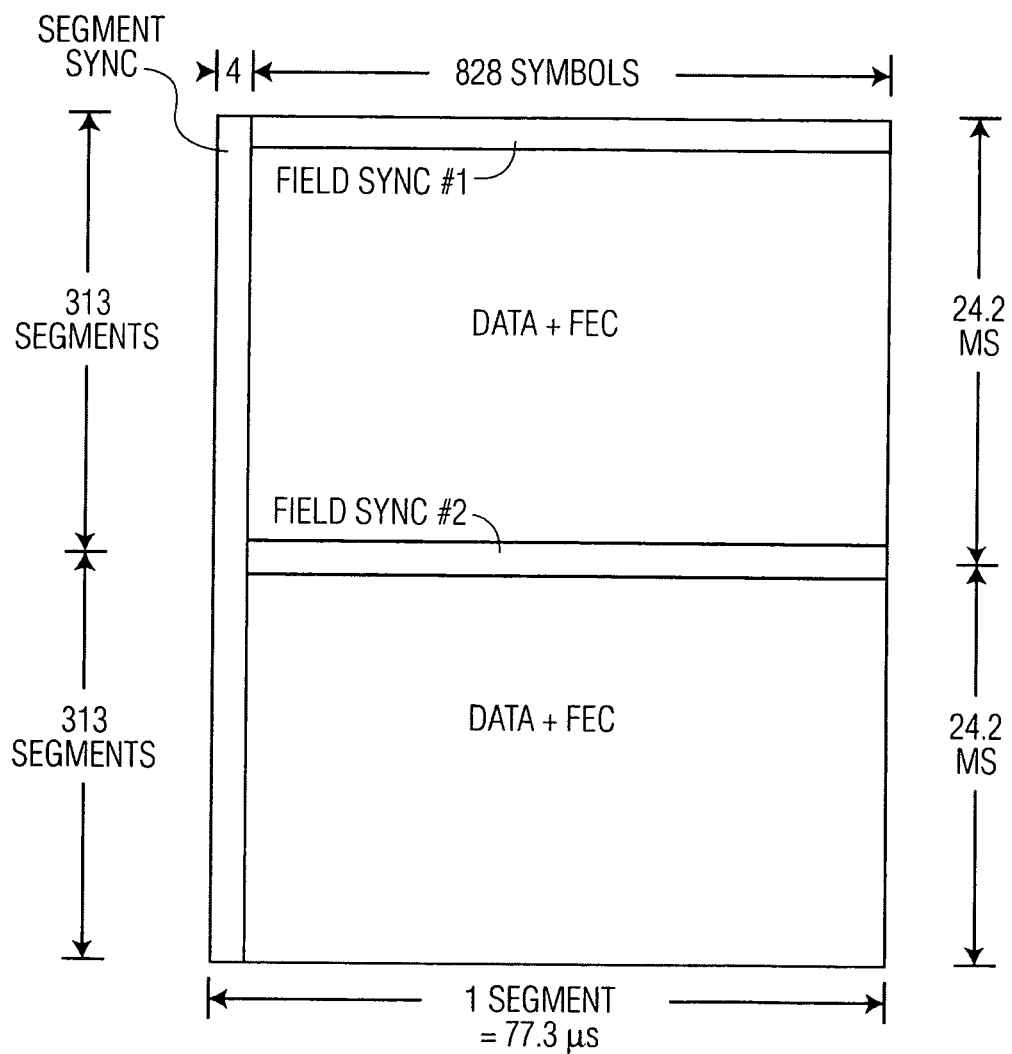
FIG. 10 is an embodiment of a VSB-8 frame.

The transmission system of FIG. 3 can be further configured to relay information to a receiver indicating the timing of a burst mode, the contents of a burst mode, and the duration of such a burst mode. One approach for communicating this information exists by inserting such information into the 104 reserved symbols that exist in the field sync that is used for a VSB-8 frame as shown in FIG. 10, with the 104 reserved symbols representing 13 bytes (each symbol represents a bit). It is contemplated that in various embodiments, the symbols being used can have a size that is larger than one bit, resulting in a larger array of values than shown below.

TABLE 1

| Bytes | Function |
|---|---|
| 1 | Burst/Regular Transmission |
| 2-3 | Number of Contiguous Packets for a Burst Mode |
| 4 | Indicating Data is Video, Audio, Interactive Information, or System Information |
| 5 | Data Should Be Cached in the Mobile Device |
| 6 | Data Representing a Program or Commercial |
| 7 | Encoding of Received Information |
| 8-9 | Association of Information with a Broadcast Channel |
| 10 | Association of Information with a Sub-Broadcast Channel |
| 11 | Reserved |

Table 1 is a sample breakdown how the 104 reserve symbols can be allocated. The first byte represents whether the data being received is for a burst mode "00000001" or not "00000000", for example. The second through third bytes represent how many contiguous packets are will be burst packets. Optionally, the second and third byte values can be set at all "1"s to indicate that burst packets will continue indefinitely until the values are set to "0"s.

The values for a sample fourth byte are shown in Table 2, where different sample values are shown.

TABLE 2

| Binary Value | Data Type |
|---|---|
| 00000000 | Audio |
| 00000010 | Video |
| 00000100 | Audio and Video |
| 00001000 | System Information |
| 00100000 | Information for an Interactive Application |
| 01000000 | Miscellaneous Information |

Table 3 discloses a sample values indicating the programming content within a burst mode for a sixth byte.

| Binary Value | Program Type |
|---|---|
| 00000000 | Radio |
| 00000010 | Television Program |

-continued

| Binary Value | Program Type |
|---|---|
| 00000100 | Music Video |
| 00001000 | Commercial |
| 00100000 | Interactive Information |
| 01000000 | JAVA Code |

The seventh byte indicates the type of encoding using for the information that is being received. Various examples of these values (shown in decimal form) are disclosed in Table 4.

TABLE 4

| Binary Value | Encoding Type |
|---|---|
| 00000000 | MPEG-2 Video |
| 00000001 | MP3 Encoded Audio |
| 00000010 | MP3 Pro Encoded Audio |
| 00000100 | AC-3 Encoded Audio |
| 00001000 | H.264 Video - Baseline Profile |
| 00100000 | H.264 Video - Main Profile |
| 01000000 | H.264 Video - Extended Profile |
| 10000000 | H.264 Video - High 10 Profile |
| 10000001 | H.264 Video - High 4:2:2 Profile |
| 10000011 | H.264 Video - High 4:4:4 Profile |

The eighth and the ninth bytes are reserved to indicate a particular broadcast channel (0-2^16) to that the information in the burst mode would be associated with. In a preferred embodiment, the channels used would correspond to the channel numbering used for a broadcast channel using ATSC A/53. Similarly, the tenth byte can represent a particular subchannel, where the numbering preferably corresponds to the sub-channel numbering used for ATSC A/53. The eleventh byte is reserved for future operations such as transmitting information about the coding rate of the burst mode (1/2, 3/4, etc).

In an optional embodiment, the eleventh can be configured to represent a time value, which would represent the next time a burst mode will be implemented. This is to account for the scenario where a burst mode does not comprise contiguous blocks. Other examples can be implemented in view of this optional embodiment where one would use different values to represent different things about the burst mode to be transmitted.

In an alternative embodiment, the 104 reserve symbols are split up in the segment sync where only 92 symbols are going to be available, as 12 of the reserve symbols are going to correspond to the last 12 symbols from a prior data segment. In this case, one can use the segment sync as a type of control package as to indicate rate information and burst mode occurrence information in the reserve symbols, and then use the payload of the data segment to indicate information such as the content of the burst mode and/or additional information about the burst mode (as described in Tables 1-4).

Other configurations of how to allocate the reserve symbols in the field sync can be implemented, in view of the examples given above. Alternatively, one can communicate burst mode information by using the PID values which are decoded as part of an MPEG-2 Transport stream, where such PID values can be set up to represent the various values given above as shown for the sync block.

In an further optional embodiment, it is anticipated that since the principles of this invention will be applied to mobile devices such as cellular phones, laptop computers, and the like, the use of the burst mode information will indicate to a portable device when it should power up or down to receive a transmission. That is, if the content is not of interest to a user (in view of a user profile), the device will ignore the contents of the burst mode because the device will know what the contents of the burst mode transmission will be ahead of time. For example, if a user is not interested a television show and prefers only audio transmissions, by referring to the information in Table 3, the device will know whether or not it should power up for a particular burst mode, as the device will know both the contents of the burst mode and how long it should last (referring to information in the first to third byte). Other configuration of the principles of this embodiment can be implemented, in view of the principles disclosed of this invention.

While the embodiments can be susceptible to various modifications and alternative forms, specific embodiments have been shown by way of example in the drawings and have been described in detail herein. However, it should be understood that the disclosure is not intended to be limited to the particular forms disclosed. Rather, the disclosure is to cover all modifications, equivalents and alternatives falling within the scope of the disclosure as defined by the following appended claims.

The invention claimed is:

1. A method for communicating burst mode information in a digital broadcast system, the method comprising:
Transmitting, from a transmitter, a packet including data indicating when a burst mode will take place during first transmission mode; such information including a length of a burst mode and wherein information about when a burst mode will take place is inserted into a header of the packet, and information about content of a burst mode is inserted into the packet payload.

2. The method of claim 1, comprising transmitting burst mode information including data indicating the content of the burst mode information.

3. The method of claim 2, comprising transmitting burst mode information including at least one of: a video program, an audio program, system maintenance information, an advertisement, and interactive information.

4. The method of claim 2, comprising transmitting burst mode information indicating an encoding format of content transmitted during the burst mode.

5. The method of claim 2, comprising transmitting burst mode information indicating that the burst mode information is an advertisement and said advertisement is to be played back in accordance with a user profile.

6. The method of claim 2, comprising transmitting burst mode information indicating to a receiver when to power up to capture burst mode content and when to power down to ignore such burst mode content.

7. The method of claim 1, wherein said information is inserted into a field sync packet used for a Vestigial Side Band transmission.

8. The method of claim 1, wherein said information is inserted into a packet identifier.

9. A transmitter for communicating burst mode information in a digital broadcast system, the transmitter comprising:
an encoder configured to generate a packet including data indicating when a burst mode will take place during first transmission mode; such information including a length of a burst mode and wherein information about when a burst mode will take place is inserted into a header of the packet, and information about content of a burst mode is inserted into the packet payload.

10. The transmitter of claim 9, further configured to transmit burst mode information including data indicating the content of the burst mode information.

11. The transmitter of claim 10, wherein the burst mode information further includes at least one of: a video program, an audio program, system maintenance information, an advertisement, and interactive information.

12. The transmitter of claim 10, wherein the burst mode information further indicates an encoding format of content transmitted during the burst mode.

13. The transmitter of claim 10, wherein the burst mode information further indicates that the burst mode information is an advertisement and said advertisement is to be played back in accordance with a user profile.

14. The transmitter of claim 10, wherein the burst mode information further indicates to a receiver when to power up to capture burst mode content and when to power down to ignore such burst mode content.

15. The transmitter of claim 9, wherein said information is inserted into a field sync packet used for a Vestigial Side Band transmission.

16. The transmitter of claim 9, wherein said information is inserted into a packet identifier.

\* \* \* \* \*